United States Patent
Pelz et al.

(10) Patent No.: US 10,237,940 B2
(45) Date of Patent: Mar. 19, 2019

(54) THERMAL PROTECTION FOR LIGHT EMITTING DEVICES

(71) Applicant: Infineon Technologies AG, Neubiberg (DE)

(72) Inventors: Georg Pelz, Ebersberg (DE); Cristian Mihai Boianceanu, Bucharest (RO); Jerome Kirscher, Munich (DE); Monica Rafaila, Munich (DE)

(73) Assignee: Infineon Technologies AG, Neubiberg (DE)

( * ) Notice: Subject to any disclaimer, the term of this patent is extended or adjusted under 35 U.S.C. 154(b) by 65 days.

(21) Appl. No.: 15/389,921

(22) Filed: Dec. 23, 2016

(65) Prior Publication Data
US 2018/0184495 A1    Jun. 28, 2018

(51) Int. Cl.
| | | |
|---|---|---|
| B60Q 1/26 | (2006.01) | |
| H05B 33/08 | (2006.01) | |
| B60Q 1/14 | (2006.01) | |
| F21S 8/10 | (2006.01) | |

(Continued)

(52) U.S. Cl.
CPC ....... H05B 33/0854 (2013.01); B60Q 1/1423 (2013.01); F21S 45/49 (2018.01); F21S 48/321 (2013.01); H05B 33/0884 (2013.01); B60Q 2300/056 (2013.01); F21Y 2115/10 (2016.08)

(58) Field of Classification Search
CPC . H05B 33/0854; H05B 33/0884; F21S 45/49; F21S 48/321; B60Q 1/1423; B60Q 2300/056; F21Y 2115/10
See application file for complete search history.

(56) References Cited

U.S. PATENT DOCUMENTS

| | | | | |
|---|---|---|---|---|
| 9,485,813 | B1* | 11/2016 | Lewis | ........ H05B 33/0809 |
| 2006/0145636 | A1* | 7/2006 | Bacon | ........ H05B 33/0812 |
| | | | | 315/312 |

(Continued)

OTHER PUBLICATIONS

Lüdecke, et al., "Modeling in Hardware Description Languages for the Simulation of Coupled Fluidic,Thermal and Electrical Effects," IEEE/ACM International Workshop on Behavioral Modeling and Simulation (BMAS), 1999, 6 pp. (Applicant points out, in accordance with MPEP 609.04(a), that the year of publication, 1999, is sufficiently earlier than the effective U.S. filing date, Dec. 23, 2016, so that the particular month of publication is not in issue).

(Continued)

*Primary Examiner* — Seokjin Kim
(74) *Attorney, Agent, or Firm* — Shumaker & Sieffert, P.A.

(57) ABSTRACT

A device for thermal protection is described. The device may be configured to determine current temperature information for a set of light emitting diodes (LEDs), receive an indication of a requested light pattern for the set of LEDs, and determine predicted temperature information for the set of LEDs based on the current temperature information and the requested light pattern. In this example, the device is further configured to operate the set of LEDs at a modified light pattern that is different from the requested light pattern in response to determining that the predicted temperature information indicates that the set of LEDs operates at an unsafe temperature when operating at the requested light pattern.

21 Claims, 11 Drawing Sheets

(51) Int. Cl.
    *F21S 45/49*     (2018.01)
    *F21Y 115/10*     (2016.01)

(56) References Cited

U.S. PATENT DOCUMENTS

| | | | |
|---|---|---|---|
| 2012/0161633 A1* | 6/2012 | Nishitani | F21V 23/007 |
| | | | 315/117 |
| 2014/0232268 A1* | 8/2014 | Kamoi | H05B 33/089 |
| | | | 315/117 |
| 2017/0253172 A1* | 9/2017 | Canonne | G06T 7/97 |

OTHER PUBLICATIONS

Rafaila, et al., "Simulation-Based Sensitivity and Worst-Case Analyses of Automotive Electronics," IEEE International Symposium on Design and Diagnostics of Electronic Circuits and Systems Apr. 14-16, 2010, 4 pp.

"Audi lighting technology and design," Audi, retrieved from http://www.audi.ch/ch/web/fr/vorsprung_durch_technik/content/2015/03/light_html, Mar. 2015, 7 pp.

* cited by examiner

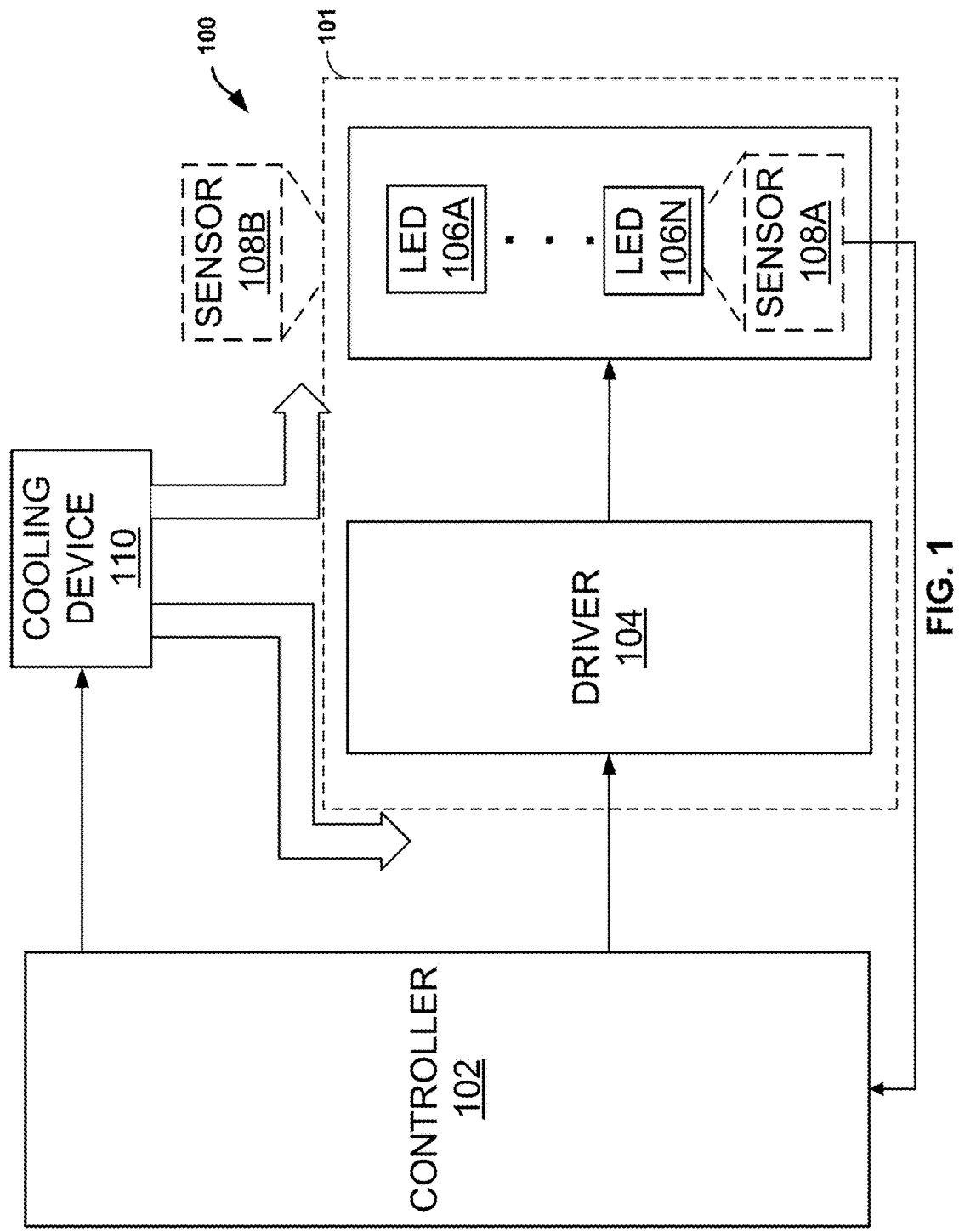

THERMAL PROTECTION FOR LIGHT EMITTING DEVICES

TECHNICAL FIELD

This disclosure relates to light emitting devices, and more particular, to techniques and circuits associated with light emitting diodes (LEDs).

BACKGROUND

Light emitting devices, for instance, light emitting diodes (LEDs), may be operated by a driver circuit. The driver circuit may control a light intensity output by an LED by varying an average amount of current flowing through the LED. For example, the driver circuit may increase a duty cycle of a current output to an LED to increase a light intensity output by the LED. Similarly, the driver circuit may decrease the duty cycle of the current output to an LED to decrease the light intensity output by the LED.

SUMMARY

The disclosure describes techniques, devices and systems for thermal protection for light emitting devices. In some examples, systems may rely on temperature measurements at each light emitting diode (LED) to ensure that LEDs are operating at a safe temperature. For example, a system may reduce a current through a first LED corresponding to a temperature measurement that exceeds a safe operating temperature associated with the first LED. In this example, the system may maintain or increase a current through a second LED corresponding to a temperature measurement that is less than a safe operating temperature associated with the second LED. However, in some applications, for instance where many LEDs (e.g., 1024) are arranged to form a matrix LED device, it may be cost prohibitive to include a thermal sensor for temperature measurements at each LED of the matrix LED device.

In accordance with one or more aspects of this disclosure, rather than relying only on a temperature measurement at each LED, thermal protection techniques are proposed that use predicted temperature information. More specifically, rather than relying only on temperature measurements to detect when a potentially damaging temperature occurs at an LED, thermal protection techniques are proposed that use predicted temperature information to proactively prevent potentially damaging temperatures from occurring at the LED. Further, some light emitting devices, for instance, but not limited to, a matrix LED device, may have space limitations that prevent an inclusion of thermal sensors within the matrix LED device. For instance, a matrix LED device having 1024 LEDs may not have space to include 1024 thermal sensors for obtaining a temperature measurement at each of the 1024 LEDs. Accordingly, a risk of failure of a set of LEDs (e.g., a LED matrix) may be eliminated, even in devices where space limitations may prevent sensors at each LED of the set of LEDs.

In some examples, the disclosure is directed to a device configured to determine current temperature information for a set of LEDs, receive an indication of a requested light pattern for the set of LEDs, and determine predicted temperature information for the set of LEDs based on the current temperature information and the requested light pattern. A light pattern may indicate a light intensity (e.g., greyscale picture) for each LED of a set of LEDs. In instances where the set of LEDs is an LED matrix device, the light pattern may indicate a light intensity for each pixel (e.g., LED) of the matrix LED device. In this example, the device is further configured to operate the set of LEDs at a modified light pattern that is different from the requested light pattern in response to determining that the predicted temperature information indicates that the set of LEDs operates at an unsafe temperature when operating at the requested light pattern.

In some examples, the disclosure is directed to a method including determining, by a processor, current temperature information for a set of LEDs, receiving, by the processor, an indication of a requested light pattern for the set of LEDs, and determining, by the processor, predicted temperature information for the set of LEDs based on the current temperature information and the requested light pattern. In this example, the method further includes operating, by the processor, the set of LEDs at a modified light pattern that is different from the requested light pattern in response to determining that the predicted temperature information indicates that the set of LEDs operates at an unsafe temperature when operating at the requested light pattern.

In some examples, the disclosure is directed to a system including a LED matrix device comprising: an integrated LED matrix module comprising a plurality of LEDs, an integrated driver module configured to activate one or more LEDs of the integrated LED matrix module, an integrated thermal sensor configured to detect an ambient temperature at the integrated LED matrix module and to output an indication of the detected ambient temperature at the integrated LED matrix module, and a controller. The controller is configured to determine current temperature information for the LED matrix device, receive an indication of a requested light pattern for the integrated LED matrix, determine predicted temperature information for the integrated LED matrix based on the current temperature information, the requested light pattern, and the detected ambient temperature at the integrated LED matrix module, output, to the integrated driver module, an indication to operate the integrated LED matrix module at the requested light pattern when the predicted temperature information satisfies a temperature threshold, and output, to the integrated driver module, an indication to operate the integrated LED matrix module at a modified light pattern that is different than the requested light pattern when the predicted temperature information does not satisfy the temperature threshold.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 1 is a block diagram illustrating an example system configured for thermal protection using predicted temperature information, in accordance with one or more techniques of this disclosure.

DETAILED DESCRIPTION

Figure 2A:
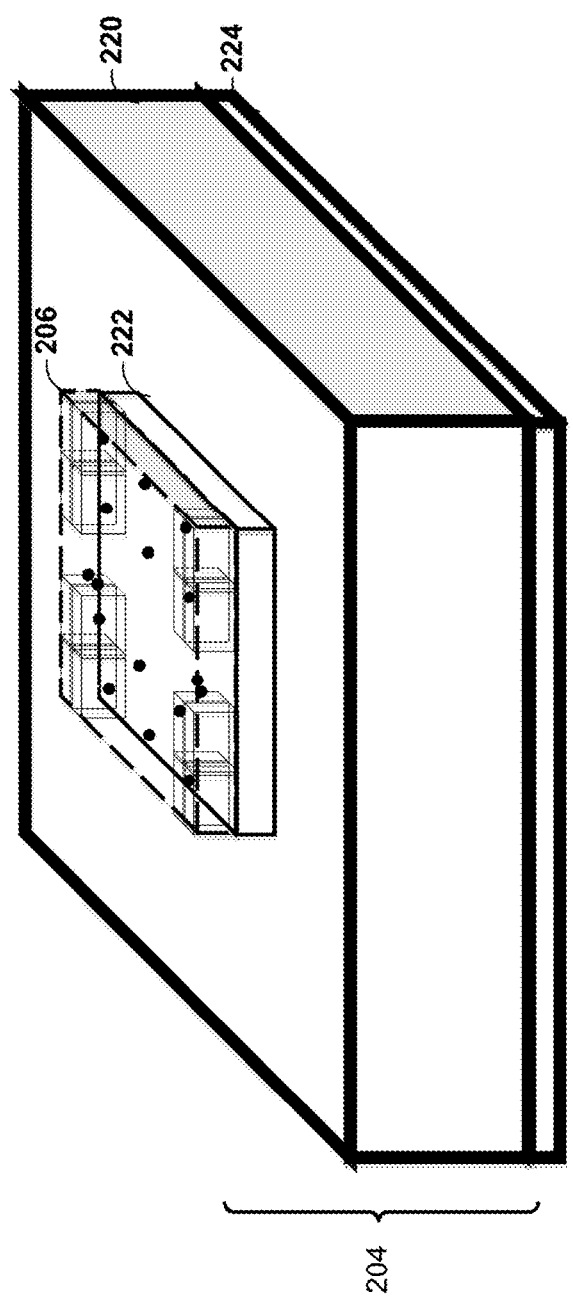
FIG. 2A is an isometric view of an LED matrix device, in accordance with one or more techniques of this disclosure.

In a wide variety of applications, various systems or devices may operate a set of light emitting diodes (LEDs). For example, spatial light emitting devices may form an LED matrix placed on one substrate and may create a pixel image of darker and brighter pixels. An exemplary application for spatial light emitting devices includes, for instance, an automotive anti-glaring operation. In this exemplary application, a camera device determines whether a headlamp outputs a headlight towards drivers of other automobiles. In response to determining that the headlamp outputs the headlight towards drivers of other automobiles, respective pixels of the LED matrix are temporally switched off or dimmed down to ensure, that the matrix-LED headlight will not blind the drivers of other cars, while providing as much light as possible. Other automotive functions of spatial light emitting devices may include, but are not limited to, dynamic displacement of the light beam output by a headlamp. For instance, spatial light emitting devices may include selectively activating LEDs of a headlamp to follow a curve in a road. Other commercial functions of spatial light emitting devices may include, but are not limited to, dynamic displacement of the light beam output by a street lamp. For instance, spatial light emitting devices may include selectively activating LEDs of a headlamp to follow a pedestrian crossing a road at night.

A limiting factor for a provision of light by a set of LEDs, such as an LED matrix, may be thermal stress in the set of LEDs that in turn may lead to degradation or even destruction of the set of LEDs. In examples, where the set of LEDs are integrated with a current driver layer, the thermal stress may additionally, or alternatively, lead to degradation or even destruction in the current driver layer. While, in some applications, it may be desirable to operate the set of LEDs to provide as much light as possible, the set of LEDs needs to be run within (but typically at the edge of) its thermal safe operating area. The thermal safe operating area for a set of LEDs may depend on heat production for a provision of regulated currents to drive the set of LEDs, heat production within the set of LEDs in the conversion of electrical energy into light, heat transport through a stack of materials for the set of LEDs, an interposer used to direct heat away from the set of LEDs, system cooling (e.g. a fan for cooling the interposer), and an environment temperature (e.g., air temperature) near or at the set of LEDs.

Systems or devices may provide thermal protection for a set of LEDs using a modified light pattern. For example, a light pattern may indicate a light intensity (e.g., greyscale picture) for each LED of a set of LEDs. For instance, a light pattern may indicate a percentage (0 to 100%) of a maximum light intensity for each LED of the set of LEDs. In instances where an LED matrix device is used, the light pattern may indicate a light intensity for each pixel (e.g., LED) of the matrix LED device. For example, in the automotive application, a light pattern may correspond to a light pattern of an anti-glaring operation that prevents each LED of the set of LEDs from emitting light towards a driver. Systems may provide thermal protection for a set of LEDs using multiple light patterns. For example, in the automotive application, a first light pattern may correspond to a first phase of a turn-beam mode for illuminating a curve in a road, a second light pattern may correspond to a second phase of the turn-beam mode, a third light pattern may correspond to a third phase of the turn-beam mode, and so on. In this way, thermal protection techniques may, rather than reactively dim LEDs operating at an unsafe temperature, proactively prevent an LED from operating at the unsafe temperature based on one or more light patterns.

FIG. 1 is a block diagram illustrating an example system 100 configured for thermal protection using predicted temperature information, in accordance with one or more techniques of this disclosure. FIG. 1 shows system 100 as having separate and distinct components, shown as controller 102, driver 104, a plurality of LEDs (e.g., LED 106A, . . . , 106N, collectively "LEDs 106"), sensors 108A and B (collectively "sensors 108"), and cooling device 110, however system 100 may include additional or fewer components. For instance, driver 104 and LEDs 106 may be two individual components or may represent a combination of one or more components that provide the functionality of system 100 as described herein. In another example, driver 104 and LEDs 106 may be integrated together on a single chip die 101.

LEDs 106 may refer to any suitable semiconductor light source. In some examples, LEDs 106 include a p-n junction configured to emit light when activated. In an exemplary application, LEDs 106 be included in a headlight assembly for automotive applications. For instance, LEDs 106 may be a matrix of light emitting diodes to light a road ahead of a vehicle. As used herein, a vehicle may refer to trucks, boats, golf carts, snowmobiles, heavy machines, or any type of vehicle that uses directional lighting.

LEDs 106 may be configured for an anti-glaring operation. As used herein, an anti-glaring operation may refer to instances where LEDs 106 are configured to prevent emitting light at a driver of another (e.g., oncoming) vehicle. For example, controller 102 may perform an anti-glaring operation that reduces a light intensity emitted (e.g., dims) or refrains from emitting any light by one or more LEDs of LEDs 106 that are determined to emit light towards a driver of a vehicle. As a position of LEDs relative to the driver changes, a light pattern of the anti-glaring operation may change. For example, LEDs 106 may be configured to operate at a requested light pattern corresponding to a first light pattern of the anti-glaring operation during a first position of LEDs 106 relative to the driver of an oncoming vehicle. In this example, as a position of LEDs 106 relative to the driver changes, LEDs 106 may operate at a set of a requested light pattern that each corresponding to a different light pattern of the anti-glaring operation such that the LEDs 106 do not emit light at the driver of an oncoming vehicle.

Sensors 108 may detect a temperature at LEDs 106. For example, sensor 108A may detect a temperature at LED 106N and output an indication of the detected temperature to controller 102. In some examples, sensors 108 may be external to LEDs 106. For instance, sensor 108B may be arranged in a neighboring chip from a LEDs 106, a different package from a LEDs 106, a same chip die as LEDs 106 but separated on the die from LEDs 106, or otherwise remote from LEDs 106. In some examples, sensors 108 may be arranged within LEDs 106. For instance, sensor 108B may be in a same package as LEDs 106. In some examples, driver 104, LEDs 106, and sensor 108A may be integrated together on chip die 101. Sensors 108 may include an electrical thermal sensor. Examples of electrical thermal sensors may include, but are not limited to, a thermistor, a thermocouple, a resistance thermometer, a silicon bandgap thermal sensor, or another electrical thermal sensor. Sensors 108 may include a mechanical thermal sensor. Examples of mechanical thermal sensors may include, but are not limited to, a thermometer, a bimetallic strip, or another mechanical thermal sensor.

Cooling device 110 may reduce an ambient temperature at LEDs 106. Although in some examples, ambient temperature may refer an air temperature (e.g., room temperature, outdoor temperature, etc.) at or near LEDs 106, in some examples, ambient temperature may refer to a reference temperature at LEDs 106, a chip die of LEDs 106, a substrate of LEDs 106, or another reference temperature of LEDs 106. That is, air (e.g. environment) temperature at or near LEDs 106 may be less than an ambient temperature at LEDs 106 when LEDs 106 generate heat or another device (e.g., a combustion engine) generates heat and may be higher than an air temperature when cooling system 110 cools LEDs 106. Cooling device 110 may include air cooling, passive cooling, liquid cooling, or other cooling.

Driver 104 may be configured to generate electrical current to control a light intensity of each LED of LEDs 106. In some examples, driver 104 may be configured to generate electrical current to control a light intensity of each LED of LEDs 106 based on outputs from controller 102. Driver 104 may include one or more current sources to drive LEDs 106. In some examples, driver 104 may include a respective current source for each LED of LEDs 106. In some examples, driver 104 may include a switching element. Examples of switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that switching elements may include a high side switch or low side switch. Additionally, switching elements may be voltage-controlled and/or current-controlled. Examples of current-controlled switching elements may include, but are not limited to, gallium nitride (GaN) MOSFETs, BJTs, or other current-controlled elements.

Controller 102 may be configured to operate LEDs 106 at a light pattern. In some examples, controller 102 may control driver 104 to output a current to LEDs 106. In some examples, controller 102 may include an analog circuit. In some examples, controller 102 may be a microcontroller on a single integrated circuit containing a processor core, memory, inputs, and outputs. For example, controller 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 102 may be a combination of one or more analog components and one or more digital components. In some examples, controller 102 may be an electronic control unit (ECU) for controlling electronic components of an automobile. In some examples, controller 102 may be processing circuity discrete from an ECU and configured to operate with the ECU. In some examples, controller 102 may operate independently from an ECU, for instance, in applications different from automotive.

Controller 102 may be configured to operate cooling device 110 at a cooling level. For example, in response to receive an indication, from sensor 108B, that chip die 101 has a temperature greater than a threshold, controller 102 may cause cooling device 110 to increase a cooling level. More specifically, for instance, controller 102 may cause a fan of cooling device 110 to increase a rotational speed to cool chip die 101.

In operation, controller 102 may determine current temperature information for LEDs 106. For example, controller 102 may receive, from sensor 108A, temperature information for LED 106N that indicates an ambient temperature at LEDs 106. In some examples, controller 102 may determine the current temperature information for LEDs 106 based on previously calculated predicted temperature information. Controller 102 may determine a requested light pattern for LEDs 106. For instance, controller 102 may determine a requested light pattern for LEDs 106 based on an anti-glaring operation. Controller 102 may determine predicted temperature information for LEDs 106 based on the current temperature information and the requested light pattern. Controller 102 may operate LEDs 106 at a modified light pattern that is different from the requested light pattern in response to determining that the predicted temperature information indicates that LEDs 106 operates at an unsafe temperature when operating at the requested light pattern. For example, controller 102 may operate LEDs 106 at a modified light pattern that dims one or more LEDs of LEDs 106 from the requested light pattern in response to determining that the predicted temperature information indicates that LEDs 106 operates at the unsafe temperature when operating at the requested light pattern. Additionally, or alternatively, controller 102 may operate cooling device 110 at a higher cooling performance in response to determining that the predicted temperature information indicates that LEDs 106 operates at the unsafe temperature when operating at the requested light pattern. For instance, controller 102 may increase a fan speed at cooling device 110 in response to determining that the predicted temperature information indicates that LEDs 106 operates at the unsafe temperature when operating at the requested light pattern.

FIG. 2A is an isometric view of an LED matrix device 200, in accordance with one or more techniques of this disclosure. As shown, LED matrix device 200 may include an integrated driver module 204, an integrated LED matrix module 206, and interface 224. Interface 224 may include one or more traces, one or more connectors, or a combination of one or more traces and one or more connectors for connecting LED matrix device 200 to controller 102 of FIG. 1. Integrated driver module 204 may be an example of driver 104 of FIG. 1. Integrated LED matrix module 206 may be an example of LEDs 106 of FIG. 1.

Integrated driver module 204 may include resistor diode logic (RDL) 222 and base chip 220. Base chip 220 may be configured to generate electrical current to control a light intensity of each LED of integrated LED matrix module 206. For instance, base chip 220 may include an array of current sources (e.g., manufactured using a smart power technology) to drive the LEDs of integrated LED matrix module 206. RDL 222 may be configured to selectively output generated electrical current received from base chip 220 to integrated LED matrix module 206. For instance, RDL 222 may output a first generated electrical current received from base chip 220 to one or more LEDs of integrated LED matrix module 206 and a second generated electrical current received from base chip 220 to one or more other LEDs of integrated LED matrix module 206.

Figure 2B:
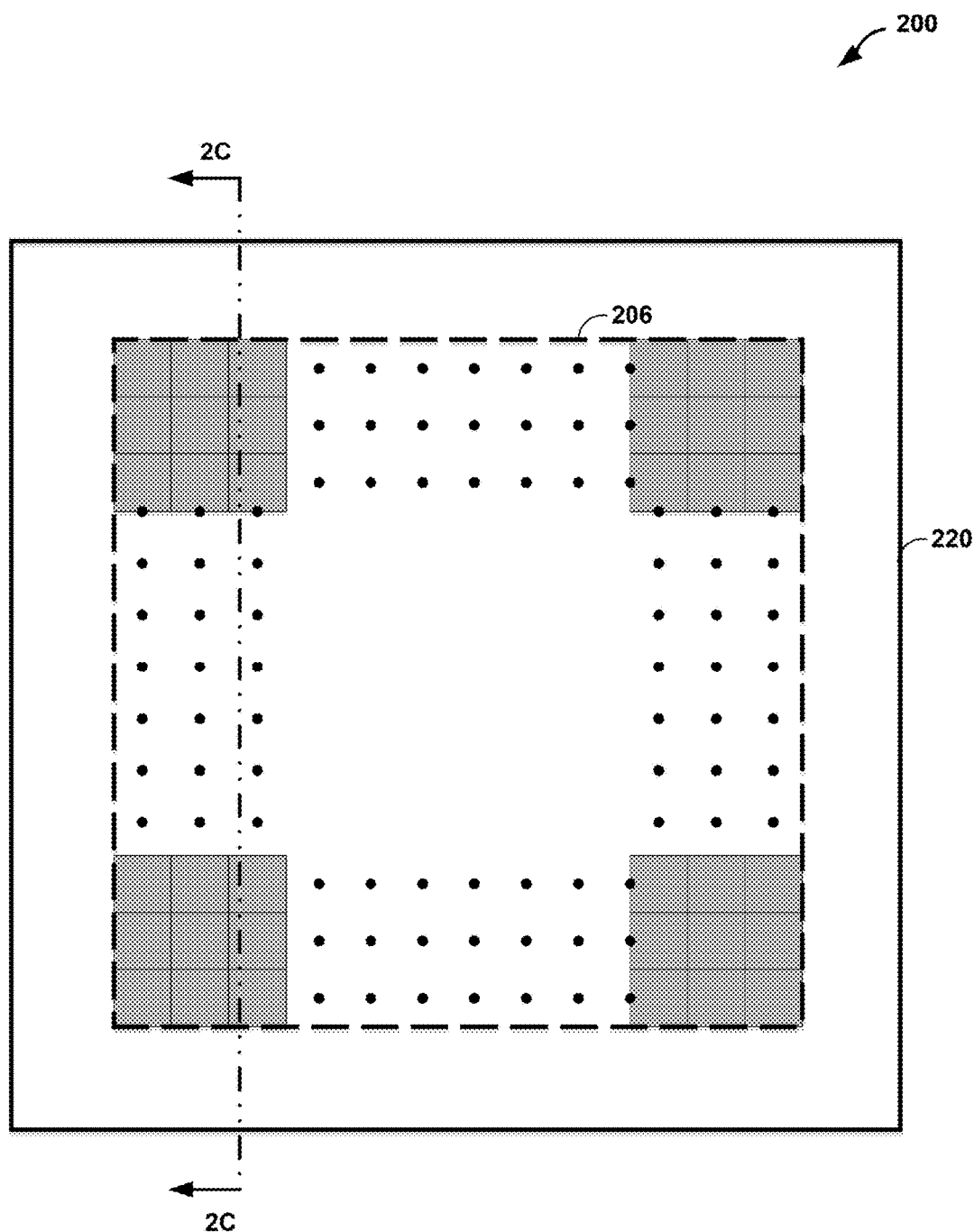
FIG. 2B is a top view of the LED matrix device of FIG. 2A, in accordance with one or more techniques of this disclosure.

FIG. 2B is a top view of the LED matrix device 200 of FIG. 2A, in accordance with one or more techniques of this disclosure. As shown, integrated LED matrix module 206 extends over base chip 220.

Figure 2C:
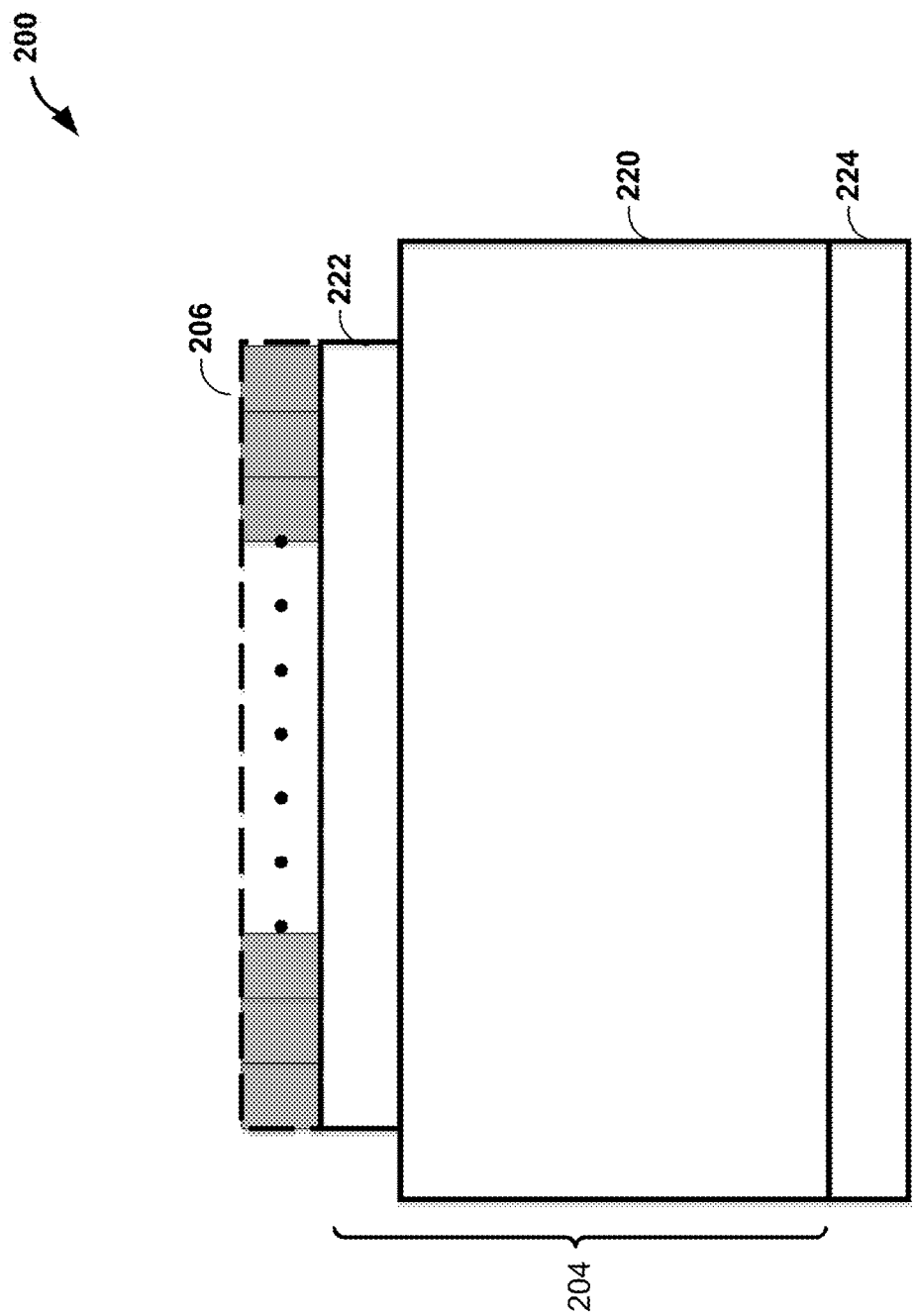
FIG. 2C is a sectional view of the LED matrix device of FIG. 2A, in accordance with one or more techniques of this disclosure

FIG. 2C is a sectional view of the LED matrix device 200 of FIG. 2A, in accordance with one or more techniques of this disclosure. As shown, integrated LED matrix module 206 extends over integrated driver module 204, which includes RDL 222 and base chip 220. Additionally, integrated LED matrix module 206 extends over interface 224.

Figure 3:
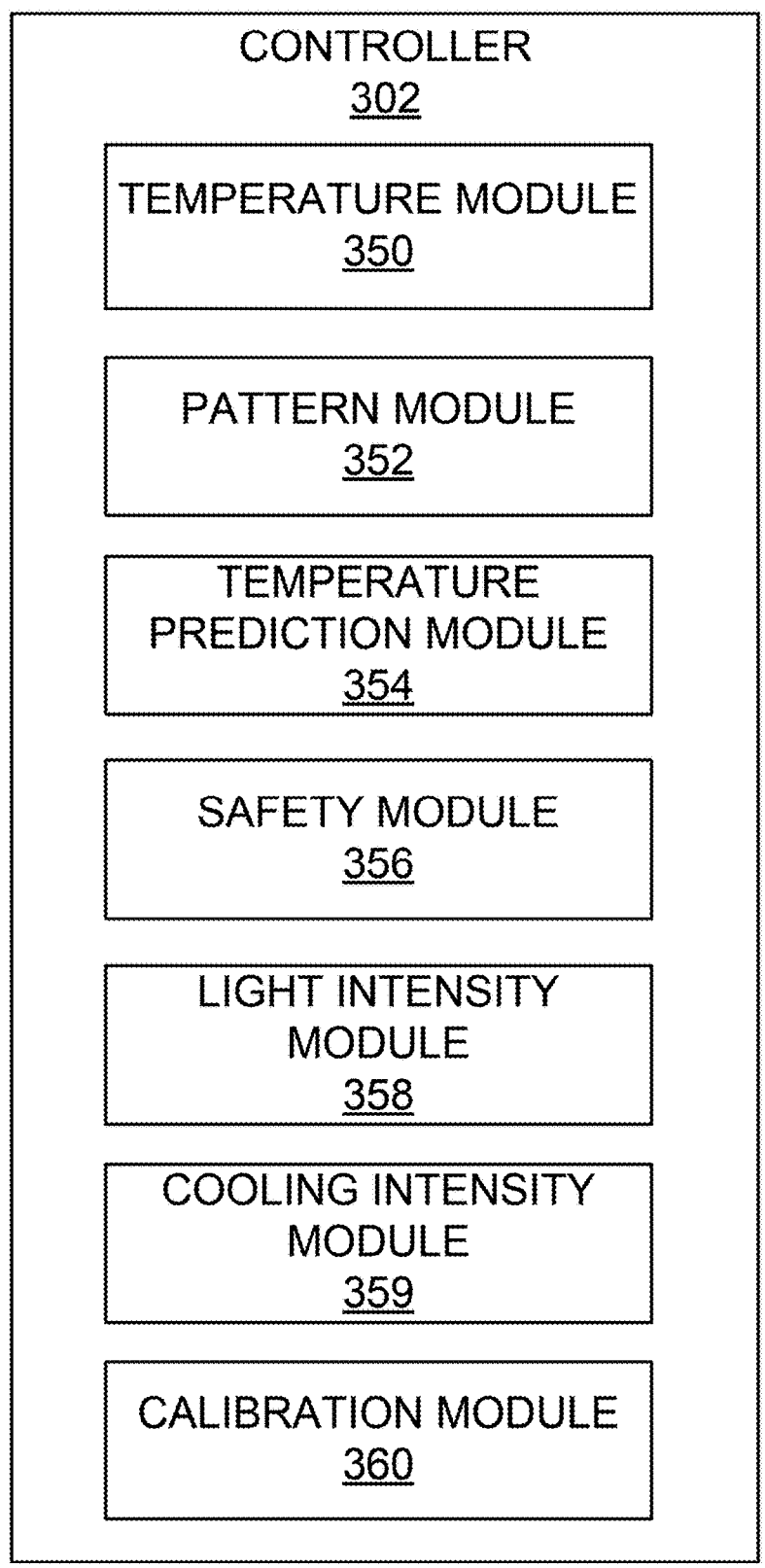
FIG. 3 is an illustration of a controller configured for thermal protection using predicted temperature information, in accordance with one or more techniques of this disclosure.

FIG. 3 is an illustration of a controller 302 configured for thermal protection using predicted temperature information, in accordance with one or more techniques of this disclosure. Controller 302 is described with respect to system 100 of FIG. 1, and LED matrix device 200 of FIG. 2 for exemplary purposes only. Controller 302 may be an example of controller 102 of FIG. 1. Controller 302 may include one or more of temperature module 350, pattern module 352, temperature prediction module 354, safety module 356, light intensity module 358, cooling intensity module 359, and calibration module 360.

Temperature module 350 may determine a current temperature based on an indication of an ambient temperature at set of LEDs 106 from a sensor arranged within the set of LEDs. For example, temperature module 350 may receive, from sensor 108A, an ambient temperature at LEDs 106 and may determine the current temperature information for integrated LED matrix module 206 as the ambient temperature.

Temperature module 350 may determine a current temperature based on an indication of an ambient temperature at set of LEDs 106 from a sensor arranged external to the set of LEDs. For example, temperature module 350 may receive, from sensor 108A, an ambient temperature at LEDs 106 and may determine the current temperature information for integrated LED matrix module 206 as the ambient temperature.

In some examples, temperature module 350 may determine the current temperature information based on previous temperature information and a previously requested light pattern. For instance, temperature module 350 may receive, from temperature prediction module 354, predicted temperature information for LEDs 106 that is determined, by temperature prediction module 354, based on the previous temperature information and the previously requested light pattern. In this manner, temperature module 350 may account for heat generated at LEDs 106 while operating LEDs 106.

Pattern module 352 may be configured to determine one or more requested light patterns for LEDs 106. For example, in response to a camera detecting a driver of an oncoming vehicle, pattern module 352 may, without user input, determine a first requested light pattern for LEDs 106 that is associated with a first light pattern of an anti-glaring operation for the headlamps such that LEDs 106 do not emit light towards the driver of an oncoming vehicle. Further, based on a predicted relative position of LEDs 106 to the driver, pattern module 352 may determine one or more additional light patterns for LEDs 106 such that LEDs 106 do not emit light towards the driver of the oncoming vehicle.

Temperature prediction module 354 may be configured to determine predicted temperature information for LEDs 106. For example, temperature prediction module 354 may be configured to determine predicted temperature information for LEDs 106 based on current temperature information, output by temperature module 350, and a requested light pattern output by pattern module 352.

Temperature prediction module 354 may be configured to determine the predicted temperature information for LEDs 106 by performing one or more classical finite elements method (FEM) techniques. Temperature prediction module 354 may be configured to determine the predicted temperature information for LEDs 106 by performing one or more finite differences method (FDM) techniques. In some examples, temperature prediction module 354 may be configured to determine the predicted temperature information for integrated LED matrix module 206 by reducing the above FEM or FDM approaches to solving a limited set of ordinary differential equations (ODE). Examples of reducing the above FEM or FDM approaches to solving a limited set of ordinary differential equations may be found, for example, in A. Lüdecke, H.-K. Trieu, G. Hoffmann, P. Weyand and G. Pelz "Modeling in Hardware Description Languages for the Simulation of Coupled Fluidic, Thermal and Electrical Effects", IEEE/ACM International Workshop on Behavioral Modeling and Simulation (BMAS), 1999. In this way, instead of a full FEM/FDM analysis, temperature prediction module 354 may determine the predicted temperature information by simply solving a limited set of ordinary differential equations, thereby reducing a computational effort.

Temperature prediction module 354 may be configured to determine the predicted temperature information for integrated LED matrix module 206 by evaluating the following function.

$$T(t+1)=f(T(t),P(t))$$

In the above equation, $T(t)$ is the temperature distribution in integrated LED matrix module 206 at time $t$ of every pixel (e.g., LED) $[x,y]$ of integrated LED matrix module 206, which includes $T_{x,y}(t)$. $T_{x,y}(t)$ is the temperatures of every single pixel, with $x=1 \ldots X$ and $y=1$ Y, where X is the number of pixels in x-direction and Y is the number of pixels in y-direction. In the above equation, $P(t)$ is the requested light pattern at time $t$, which includes of $P_{x,y}(t)$. $P_{x,y}(t)$ is the requested intensity for every single pixel [x,y]. For instance, Px,y(t) may range from 0% to 100% of a maximum light intensity.

Said differently, temperature prediction module 354 may be configured to determine the predicted temperature information for integrated LED matrix module 206 by evaluating the above equation for mapping from all $T_{x,y}(t)$ and $P_{x,y}(t)$ to the $T_{x,y}(t+1)$, which can be accomplished by a so-called "meta-model." Examples of an approximation of such a mapping may be included in, but not limited to, M. Rafaila, C. Decker, C. Grimm, G. Pelz: "Simulation-Based Sensivity and Worst-Case Analyses of Automotive Electronics", IEEE International Symposium on Design and Diagnostics of Electronic Circuits and Systems 2010.

In some examples, rather than determining predicted temperature information for each LED of integrated LED matrix module 206 at every time step, temperature prediction module 354 may be configured to selectively determine predicted temperature information. For example, in response to determining, by applying a simplified estimation equation, that a maximum plausible temperature at a LED of integrated LED matrix module 206 is less than a temperature threshold, temperature prediction module 354 may refrain from determining, by applying one or more of the FEM, FDM, reduced FEM, reduced FDM, evaluating a mapping equation, or another technique that is more computationally complicated than the simplified estimation equation, a predicted temperature at the LED to include in the predicted temperature information. In this way, controller 102 may be more computational efficient than in embodiments where controller 102 determines predicted temperature information for each LED of integrated LED matrix module 206 at every time step.

Safety module 356 may be configured to determine whether the predicted temperature information indicates that integrated LED matrix module 206 operates at an unsafe temperature when operating at the requested light pattern. For example, safety module 356 may determine that the predicted temperature information indicates that integrated LED matrix module 206 operates at an unsafe temperature when operating at the requested light pattern if the predicted temperature at one or more LEDs of integrated LED matrix module 206 does not satisfy a temperature threshold. As used herein, a predicted temperature may not satisfy a temperature threshold when the predicted temperature is greater than the temperature threshold. A temperature threshold may be associated with an LED of integrated LED matrix module 206. For instance, each LED of integrated LED matrix module 206 may be associated with a respective temperature threshold. In some examples, each LED of integrated LED matrix module 206 may be associated with a single temperature threshold for the integrated LED matrix module 206. Similarly, safety module 356 may determine that the predicted temperature information indicates that integrated LED matrix module 206 does not operate at the unsafe temperature when operating at the requested light pattern if the predicted temperature at one or more LEDs of integrated LED matrix module 206 satisfies the temperature threshold. As used herein, a predicted temperature may satisfy a temperature threshold when the predicted temperature is less than the temperature threshold.

Light intensity module 358 may be configured to determine a modified light intensity for an LED associated with an unsafe temperature. For example, light intensity module 358 may determine, for an LED of integrated LED matrix module 206, a modified light intensity (e.g., a dimmed down, or de-rated light intensity) that is less than a light intensity for the LED indicated by the requested light pattern. For instance, light intensity module 358 may dim a light intensity for an LED associated with the unsafe temperature such the LED operates at between 90 to 95% of the unsafe temperature. In some examples, light intensity module 358 may refrain from determining a modified light intensity when the safety module 356 determines that the predicted temperature information indicates that integrated LED matrix module 206 does not operate at the unsafe temperature when operating at the requested light pattern. That is, light intensity module 358 may determine the modified light intensity in response to safety module 356 determining that the predicted temperature information indicates that integrated LED matrix module 206 operates at the unsafe temperature when operating at the requested light pattern.

Light intensity module 358 may be configured to determine a modified light intensity for an LED associated with an unsafe temperature such that integrated LED matrix module 206 does not operate at an unsafe temperature and such that a difference in light intensity between the modified light pattern and a combination of requested light patterns is minimized. For example, light intensity module 358 may determine that reducing a light intensity for an LED during a first portion of the modified light pattern reduces a temperature at the LED more than a similar reduction in the light intensity for the LED during a second portion of the modified light pattern. In this example, light intensity module 358 may reduce the light intensity for the LED during the first portion of the modified light pattern instead of reducing the light intensity for the LED during the second portion of the modified light pattern. In this way, a difference in light intensity between the modified light pattern and the combination of requested light patterns may be minimized without causing integrated LED matrix module 206 to operate at the unsafe temperature.

Light intensity module 358 may be configured to determine a modified light intensity for an LED associated with an unsafe temperature such integrated LED matrix module 206 does not operate at the unsafe temperature and such that a maximum temperature for integrated LED matrix module 206 is minimized. For example, light intensity module 358 may dim a light intensity for an LED associated with an unsafe temperature such that the LED no longer operates at the unsafe temperature, where the dimmed light intensity for the LED is reduced such that the LED operates within a predetermined peak temperature for integrated LED matrix module 206. In this manner, light intensity module 358 may be configured to operate integrated LED matrix module 206 to reduce an aging of integrated LED matrix module 206 and/or to improve a cooling of integrated LED matrix module 206.

It should be understood that light intensity module 358 may be configured to determine a modified light intensity for an LED associated with an unsafe temperature using any suitable combinations of the techniques described herein. For example, light intensity module 358 may be configured to determine a modified light intensity for an LED associated with an unsafe temperature such that integrated LED matrix module 206 does not operate at an unsafe temperature, such that a difference in light intensity between the modified light pattern and a combination of requested light patterns is minimized, and such that a maximum temperature for integrated LED matrix module 206 is minimized.

Light intensity module 358 may be configured to determine a modified light intensity for an LED that is proximate to another LED associated with an unsafe temperature. That is, rather than only reducing a light intensity at an LED associated with an unsafe temperature, light intensity module 358 may reduce a light intensity at one or more LEDs near (e.g., adjacent) the LED associated with the unsafe temperature. For example, safety module 356 may determine that a first LED of integrated LED matrix module 206 operates at an unsafe temperature. In this example, light intensity module 358 may determine that a second LED of integrated LED matrix module 206 is positioned at a distance from the first LED that is within a spatial threshold. In some examples, the spatial threshold may be user defined. Additionally, or alternatively, the spatial threshold may be computed by controller 302. In some examples, the spatial threshold may indicate an arrangement of LEDs relative to a respective LED. Exemplary spatial threshold indicating an arrangement of LEDs relative to a respective LED may include, but are not limited to, LEDs arranged adjacent to a respective LED, a first set of LEDs arranged adjacent to the respective LED and a second set of LEDs arranged adjacent to the first set of LEDs, and another spatial threshold selected based on an arrangement of LEDs. In some examples, the spatial threshold may indicate a distance (e.g., nanometers, centimeters, millimeters, etc.) from a respective LED. In this example, light intensity module 358 may determine, for the second LED of integrated LED matrix module 206, a modified light intensity (e.g., a dimmed down, or de-rated light intensity) to reduce a temperature at the first LED of integrated LED matrix module 206.

Light intensity module 358 may be configured to optimize a modification of a requested light pattern. For example, light intensity module 358 may incrementally optimize the modification of the requested $P_{mod}(t)$ using an incremental approach. Examples of an incremental approach may include, but are not limited to, hill-climbing techniques (e.g., steepest descent for a next step). In some examples, light intensity module 358 may optimize the modification of the requested $P_{mod}(t)$ using an overall approach. Examples of an overall approach may include, but are not limited to, linear programming (e.g., using linear equations).

Cooling intensity module 359 may be configured to determine an initial cooling performance. For example, cooling intensity module 359 may determine the initial cooling performance according to an air temperature, ambient temperature at controller 302, ambient temperature at sensor 108A, ambient temperature at sensor 108A, or another reference temperature. For instance, cooling intensity module 359 may set a fan speed of cooling device 110 to a first level (e.g., lowest fan speed) for an ambient temperature detected by sensor 108A that is less than a first threshold (e.g., 30° C.), may set the fan speed of cooling device 110 to a second level for an ambient temperature detected by sensor 108A that is less than a second threshold (e.g., 40° C.), and so on.

Cooling intensity module 359 may work with temperature prediction module 354 to determine whether LEDs 106 operate at the unsafe temperature when operating cooling device 110 at the initial cooling performance. For example, cooling intensity module 359 may output, to temperature prediction module 354, an indication (e.g., fan speed) of an initial cooling performance for operating cooling device 110. Temperature prediction module 354 may determine initial predicted temperature information for LEDs 106 by increasing predicted temperatures at LEDs 106 from the current temperature (e.g., an ambient temperature at LEDs 106, a previously calculated predicted temperature, etc.) to account for heating caused by operating LEDs 106 at the requested light pattern and by reducing predicted temperatures at LEDs 106 to account for operating cooling device 110 at the initial cooling performance. In this manner, temperature prediction module 354 may determine initial predicted temperature information for operating cooling device 110 at an initial cooling performance.

Cooling intensity module 359 may be configured to increase a cooling performance of cooling device 110 when the initial predicted temperature information indicates that LEDs 106 operate an unsafe temperature when operating at the requested light pattern. For example, in response to temperature prediction module 354 determining that the initial predicted temperature information indicates that LEDs 106 operates at the unsafe temperature when operating at the requested light pattern, cooling intensity module 359 may increase cooling performance for operating cooling device 110. For instance, cooling module 359 may incrementally increase a cooling performance of cooling device 110 from an initial cooling performance until temperature prediction module 354 outputs predicted temperature information indicating that LEDs 106 do not operate at the unsafe temperature when operating at the requested light pattern.

Cooling intensity module 359 may be configured to determine a modified cooling performance when the initial predicted temperature indicates that LEDs 106 operate an unsafe temperature when operating at the requested light pattern. For example, in response to temperature prediction module 354 determining that the initial predicted temperature information indicates that LEDs 106 operates at the unsafe temperature when operating at the requested light pattern, cooling intensity module 359 may determine a modified cooling performance that is higher (e.g., a highest cooling performance) than the initial cooling performance.

Cooling intensity module 359 may work with temperature prediction module 354 to determine predicted temperature information when operating cooling device 110 at a modified cooling performance. For example, cooling intensity module 359 may output, to temperature prediction module 354, an indication (e.g., fan speed) of a modified cooling performance (e.g., a highest cooling performance) for operating cooling device 110. Temperature prediction module 354 may determine predicted temperature information for LEDs 106 by increasing predicted temperatures at LEDs 106 from the current temperature (e.g., an ambient temperature at LEDs 106, a previously calculated predicted temperature, etc.) to account for heating caused by operating LEDs 106 at the requested light pattern and by reducing predicted temperatures at LEDs 106 to account for operating cooling device 110 at the modified cooling performance. In this manner, temperature prediction module 354 may determine predicted temperature information for operating cooling device 110 at a modified cooling performance.

Light intensity module 358 may be configured to determine a modified light intensity for the modified cooling performance. For example, light intensity module 358 may receive, from temperature prediction module 354, predicted temperature information. In this example, the predicted temperature information for operating cooling device 110 at the modified cooling performance indicates temperatures that are less than the initial predicted temperature information because the modified cooling performance is higher (e.g., highest cooling performance) than an initial cooling performance. Light intensity module 358 may determine a modified light pattern using the modified cooling intensity that has a higher light intensity than a modified light pattern using the initial cooling intensity. Additionally, or alternatively, light intensity module 358 may determine a modified light pattern using the modified cooling intensity that has a lower operating temperature at LEDs 106 than a modified light pattern using the initial cooling intensity. In this manner, cooling intensity module 359 may permit an improved performance of LEDs 106 (e.g., a higher light intensity), improved safety and life of LEDs 106 (e.g., cooler operation of LEDs 106), or a combination of improved performance of LEDs 106 and improved safety and life of LEDs 106.

Calibration module 360 may be configured to calibrate the predicted temperature information output by temperature prediction module 354. For example, calibration module 360 may receive a temperature measurement indicating a detected temperature at integrated LED matrix module 206 and modify the predicted temperature information for integrated LED matrix module 206 based on the temperature measurement. For instance, in response to receiving, from sensor 108, a temperature measurement indicating a detected temperature at an LED of integrated LED matrix module 206 is 60° C. and receiving, from temperature prediction module 354, predicted temperature information indicating that the predicted temperature at the LED of integrated LED matrix module 206 is 65° C. calibration module 360 may modify the predicted temperature information to normalize with the temperature measurement such that the modified predicted temperature information indicating that the predicted temperature at the LED of integrated LED matrix module 206 is 60° C. (e.g., matches the temperature measurement).

In some examples, calibration module 360 may receive a temperature measurement of integrated LED matrix module 206 during a calibration procedure from one or more sensors disposed on integrated LED matrix module 206 (e.g., sensor 108A of FIG. 1). In some examples, calibration module 360 may include a diode with high sensitivity in infrared and low sensitivity in visible range and scan integrated LED matrix module 206 for a direct temperature measurement of integrated LED matrix module 206 during the calibration procedure.

Calibration module 360 may be configured to run a calibration procedure. For example, calibration module 360 may run a light pattern at a predefined ambient temperature. In this example, calibration module 360 may measure a temperature at one or more on-chip sensor(s), for instance, at one or more of sensors 108 of FIG. 1. In this example, calibration module 360 may calibrate temperature prediction module 354. For instance, calibration module 360 may output one or more correction factors that are used by temperature prediction module 354, where temperature prediction module 354, when using the one or more correction factors, generates predicted temperature information that corresponds to (e.g., matches) a predetermined temperature for the light pattern and the predefined ambient temperature. In some examples, the calibration module 360 may automatically (e.g., without receiving an indication of a user interaction) initiate the calibration procedure. For instance, calibration module 360 may periodically (e.g., every hour, day, week, year, etc.) initiate the calibration procedure when sensors 108 indicate that a detected ambient temperature matches the predefined ambient temperature.

Figure 4:
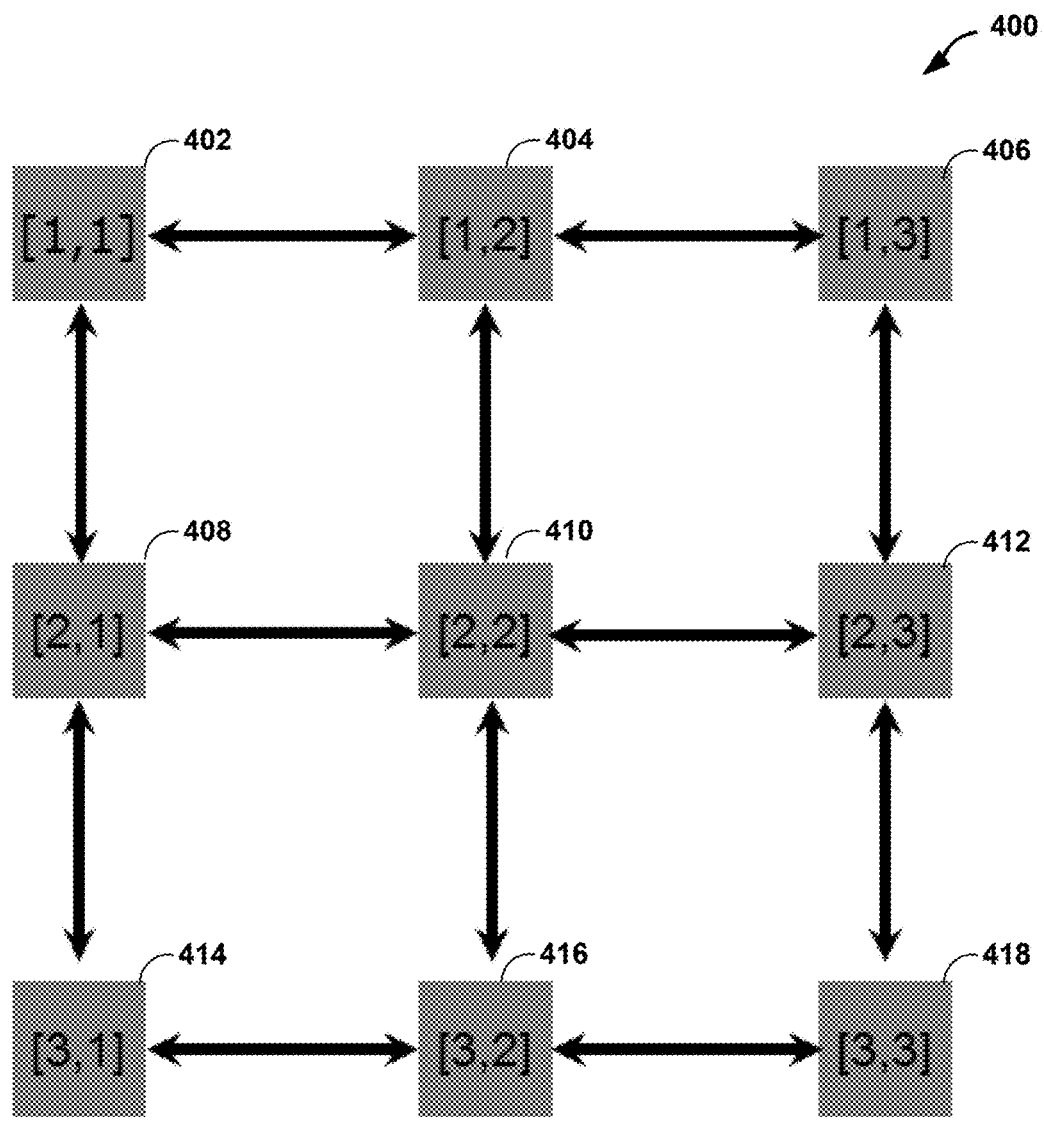
FIG. 4 is an illustration of an arrangement of a LED matrix, in accordance with one or more techniques of this disclosure.

FIG. 4 is an illustration of an arrangement of a LED matrix 400, in accordance with one or more techniques of this disclosure. LED matrix 400 may be an example of LEDs 106 of FIG. 1 and/or of integrated LED matrix module 206. As shown, LED matrix 400 includes LEDs 402-418. LED matrix 400 is described with respect to temperature prediction module 354 for exemplary purposes only. For instance, controller 102 may perform similar techniques.

Temperature prediction module 354 may be configured to determine the predicted temperature information for integrated LED matrix module 206 (e.g., determining $T_{x,y}(t+1)$) by taking into account only the nearest neighbouring LEDs (only in x and x direction or in addition taking into account the diagonals). For example, temperature prediction module 354 may be configured to determine a predicted temperature for only LEDs 402-418 if LED 410 (e.g., $T_{2,2}(t+1)$) is to be simulated. That is, if $T_{2,2}(t+1)$ is simulated temperature prediction module 354 may only determine temperature information (with only limited deviations) to the nearest neighbours (incl. diagonals), e.g. $T_{1,1}(t)$ . . . $T_{3,3}(t)$ and $P_{1,1}(t)$ . . . $P_{3,3}(t)$. In this way, temperature prediction module 354 may reduce a computational burden in determining the predicted temperature information compared with techniques that take into account all LEDs (e.g., 1024) of integrated LED matrix module 206.

Figure 5A:
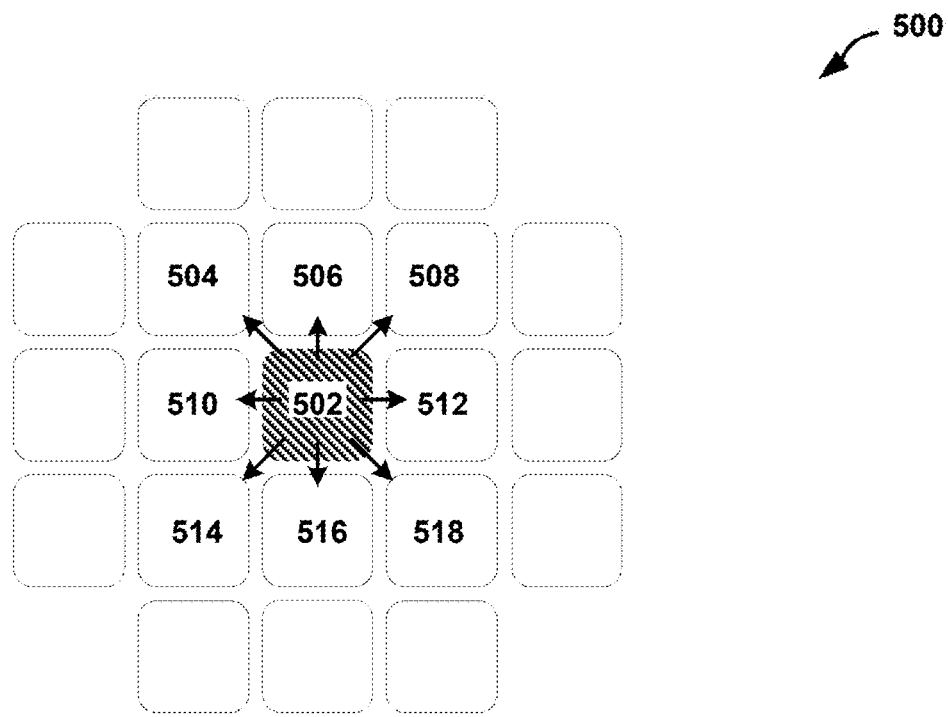
FIG. 5A is an illustration of a first thermal conduction at a LED matrix, in accordance with one or more techniques of this disclosure.

FIG. 5A is an illustration of a first thermal conduction at a LED matrix 500, in accordance with one or more techniques of this disclosure. LED matrix 500 may be an example of LEDs 106 of FIG. 1 and/or of integrated LED matrix module 206. As shown, LED matrix 500 includes LEDs 502-518. LED matrix 500 is described with respect to temperature prediction module 354 for exemplary purposes only. For instance, controller 102 may perform similar techniques.

Temperature prediction module 354 may be configured to account for heat transfer between LEDs of LED matrix 500. For example, temperature prediction module 354 may determine a predicted temperature for LED 502. In this example, in response to determining that the predicted temperature for LED 502 indicates an increase in temperature (e.g., is hot), temperature prediction module 354 may predict a respective increase in temperature for each of LEDs 504-518. As shown, in some examples, temperature prediction module 354 may account for heat transfer only at neighboring (e.g., adjacent) LEDs.

Figure 5B:
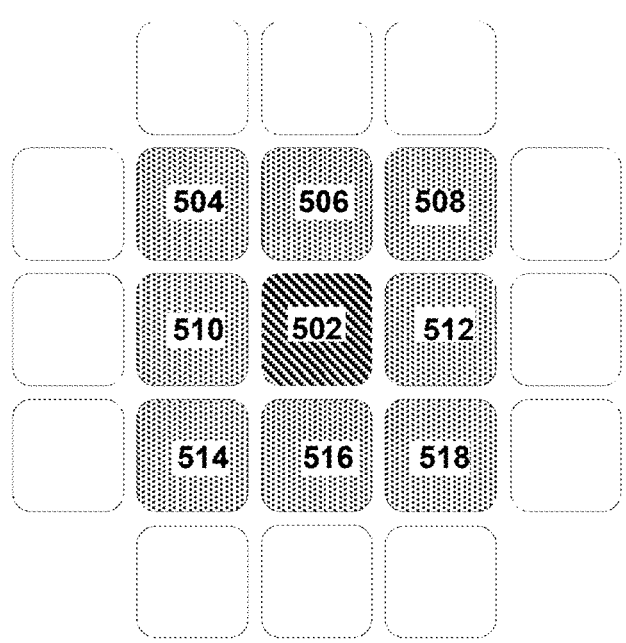
FIG. 5B is an illustration of a result of the first thermal conduction of FIG. 5A, in accordance with one or more techniques of this disclosure.

FIG. 5B is an illustration of a result of the first thermal conduction of FIG. 5A, in accordance with one or more techniques of this disclosure. In the example of FIG. 5B, temperature prediction module 354 increased a predicted temperature for LEDs 504-518 in response to determining that the predicted temperature for LED 502 indicates an increase in temperature (e.g., is hot).

Figure 6A:
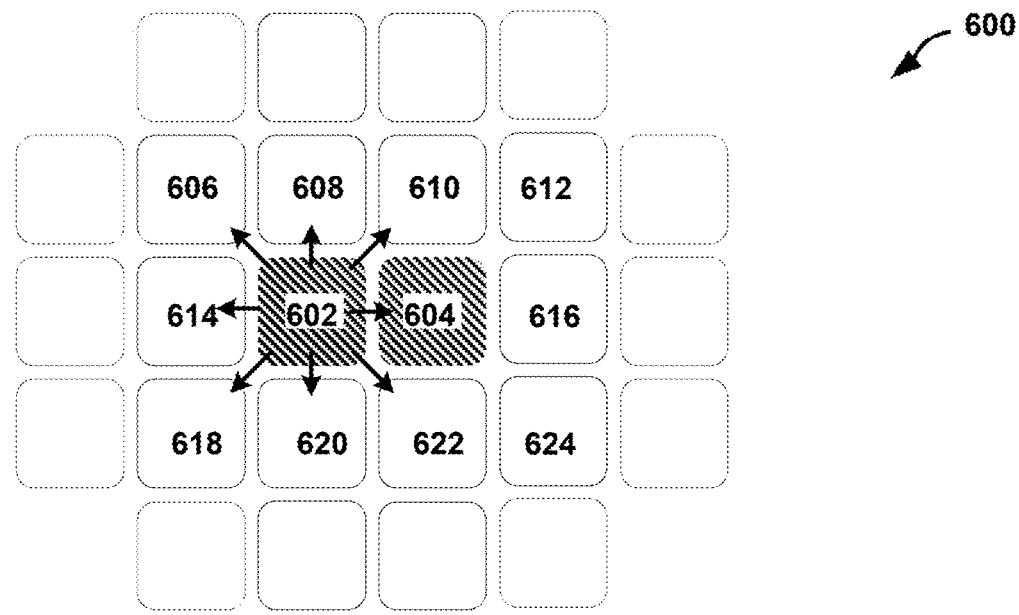
FIG. 6A is an illustration of a thermal conduction by a first LED of a LED matrix, in accordance with one or more techniques of this disclosure.

FIG. 6A is an illustration of a thermal conduction by a first LED of a LED matrix 600, in accordance with one or more techniques of this disclosure. LED matrix 600 may be an example of LEDs 106 of FIG. 1 and/or of integrated LED matrix module 206. As shown, LED matrix 600 includes LEDs 602-624. LED matrix 600 is described with respect to temperature prediction module 354 for exemplary purposes only. For instance, controller 102 may perform similar techniques.

Temperature prediction module 354 may be configured to account for heat transfer between multiple LEDs of LED matrix 600. For example, temperature prediction module 354 may determine a predicted temperature for LED 602. In this example, in response to determining that the predicted temperature for LED 602 indicates an increase in temperature (e.g., is hot), temperature prediction module 354 may predict an increase in temperature for neighboring LEDs 604-610, 614, and 618-622.

Figure 6B:
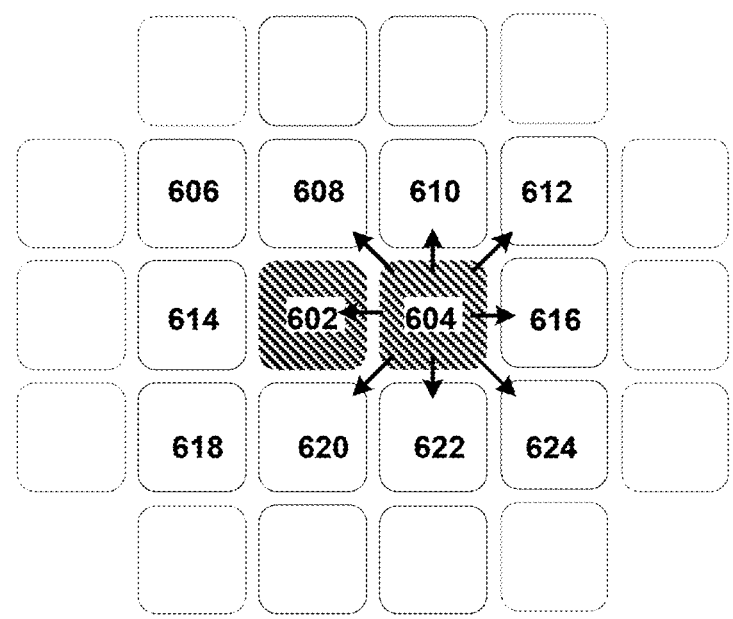
FIG. 6B is an illustration of a thermal conduction by a second LED of the LED matrix of FIG. 6A, in accordance with one or more techniques of this disclosure.

FIG. 6B is an illustration of a thermal conduction by a second LED of the LED matrix 600 of FIG. 6A, in accordance with one or more techniques of this disclosure. Temperature prediction module 354 may be configured to account for heat transfer between multiple LEDs of LED matrix 600. For example, temperature prediction module 354 may determine a predicted temperature for LED 604. In this example, in response to determining that the predicted temperature for LED 604 indicates an increase in temperature (e.g., is hot), temperature prediction module 354 may predict an increase in temperature for neighboring LEDs 602, 608-612, 616, and 620-624.

Figure 6C:
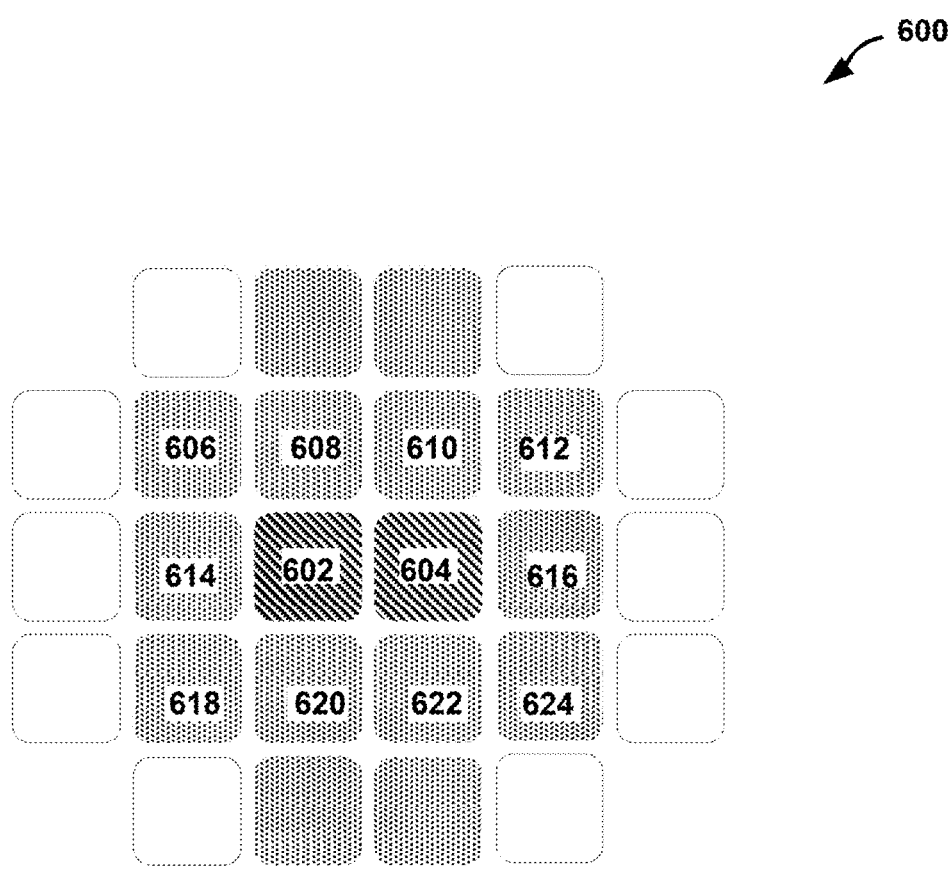
FIG. 6C is an illustration of a result of the thermal conductions of FIGS. 6A and 6B, in accordance with one or more techniques of this disclosure.

FIG. 6C is an illustration of a result of the thermal conductions of FIGS. 6A and 6B, in accordance with one or more techniques of this disclosure. In the example of FIG. 6C, temperature prediction module 354 may be configured to account for heat transfer between LEDs of LED matrix 600. More specifically, temperature prediction module 354 combines, through superposition, the heat transfer from LED 602 to LEDs 604-610, 614, and 618-622 and the heat transfer from LED 604 to LEDs 602, 608-612, 616, and 620-624 to determine combined increases in a predicted temperature for LEDs 602-624.

Figure 7:
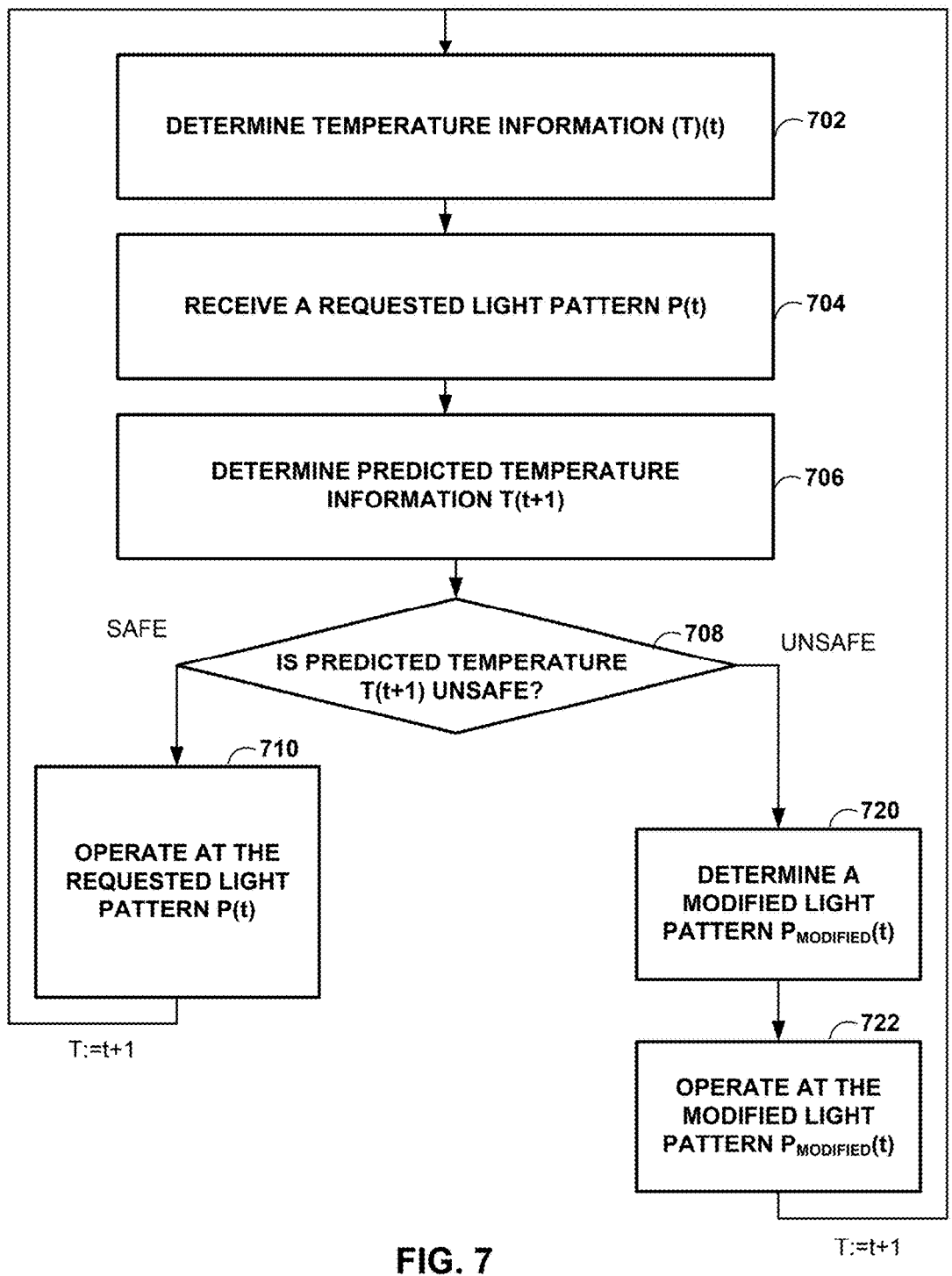
FIG. 7 is a flow diagram for thermal protection techniques using a single requested light pattern that may be performed by a circuit in accordance with this disclosure.

FIG. 7 is a flow diagram for thermal protection techniques using a single requested light pattern that may be performed by a circuit in accordance with this disclosure. For purposes of illustration only, the example operations are described below within the context of system 100 of FIG. 1, LED matrix device 200 of FIGS. 2A-C, and controller 302 of FIG. 3.

In accordance with one or more techniques of this disclosure, controller 102 determines temperature information (702). For example, controller 102 collects the temperature pixel image T(t), which may be similar to the ambient temperature for all pixels in the moment of switching-on lighting or known from the previous loop. Controller 102 receives a requested light pattern (704). For example, controller 102 collects the requested light pattern P(t), which may already have been corrected in the previous loop. Controller 102 determines predicted temperature information (706). In some examples, controller 102 may determine the predicted temperature information based on a modified cooling performance for operating cooling device 110.

Controller 102 determines whether the predicted temperature information indicates that set of LEDs 106 operates at an unsafe temperature when operating at the requested light pattern (708). For example, controller 102 simulates the new temperature pixel image T(t+1) for integrated LED matrix module 206 (the simulation result may be calibrated using a small number of on-chip thermal sensors, which take into account ambient temperature):

$$T(t+1)=f(T(t),P(t))$$

In response to determining that the predicted temperature information indicates that set of LEDs 106 does not operate at the unsafe temperature ("SAFE" of 708), controller 102 operates at the requested light pattern (710). For example, in response to determining that T(t+1) is safe, controller 102 applies P(t) on set of LEDs 106. In response, however, to determining that the predicted temperature information indicates that set of LEDs 106 operates at an unsafe temperature when operating at the requested light pattern ("UNSAFE" of 708), controller 102 determines a modified light pattern (720) and operates at the modified light pattern (722). For example, in response to determining that T(t+1) is not safe, controller 102 finds a modification $P_{mod}(t)$ for P(t). In some examples, in response to determining that T(t+1) is not safe, controller 102 finds a modification $P_{mod}(t)$ for P(t), which avoids over-temperature in pixels of T(t+1). Additionally, or alternatively, in response to determining that T(t+1) is not safe, controller 102 finds a modification $P_{mod}(t)$ for P(t), which optimizes the change of P(t), e.g. with the goal of minimizing the change. After determining the modification $P_{mod}(t)$, controller 102 applies the latest $P_{mod}(t)$ on set of LEDs 106. In any case, after controller 102 applies P(t) or the latest $P_{mod}(t)$ on set of LEDs 106, controller 102 may increment the time ("t:=t+1") and restart the process.

Figure 8:
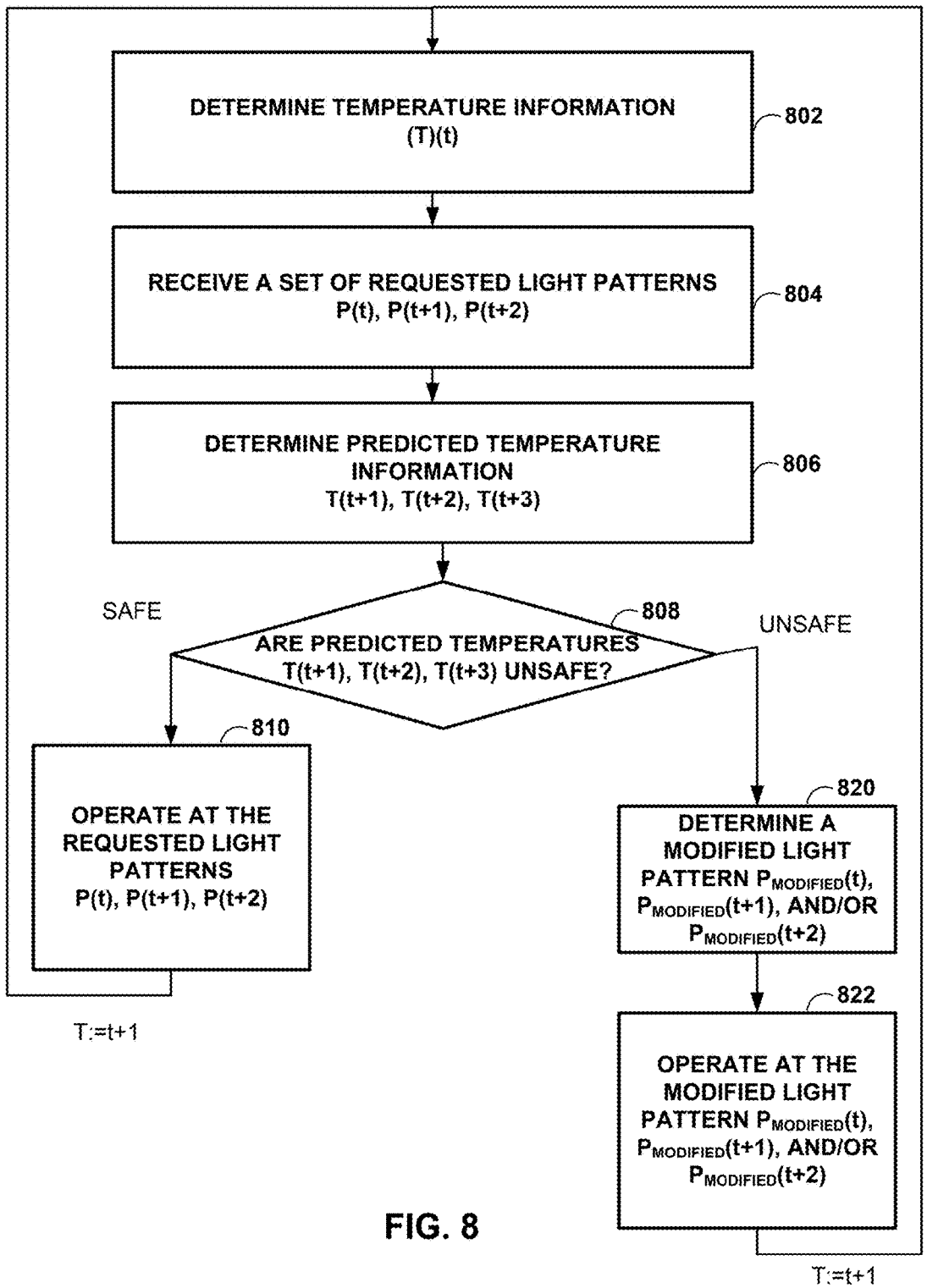
FIG. 8 is a flow diagram for thermal protection techniques using multiple requested light patterns that may be performed by a circuit in accordance with this disclosure.

FIG. 8 is a flow diagram for thermal protection techniques using multiple requested light patterns that may be performed by a circuit in accordance with this disclosure. For purposes of illustration only, the example operations are described below within the context of system 100 of FIG. 1, LED matrix device 200 of FIGS. 2A-C, and controller 302 of FIG. 3.

In accordance with one or more techniques of this disclosure, controller 102 determines temperature information (802). For example, controller 102 may collect the temperature pixel image T(t), which may be similar to the ambient temperature for all pixels in the moment of switching-on or known from the previous loop. Controller 102 receives a set of requested light patterns (804). For example, controller 102 may collect the requested light pattern P(t) and the patterns P(t+1), P(t+2), . . . , P(t+n) as planned for the near future, which may already have been corrected in the previous loop.

Controller 102 determines predicted temperature information (806). For example, controller 102 may simulate the temperature pixel images of the near future T(t+1), T(t+2), . . . , T(t+n) for integrated LED matrix module 206. In some examples, simulating the temperature pixel images of the near future T(t+1), T(t+2), . . . , T(t+n) for integrated LED matrix module 206 may include controller 102 calibrating the result, using a small number of on-chip thermal sensors (e.g., sensor 108A of FIG. 1). In some examples, controller 102 may determine the predicted temperature information based on a modified cooling performance for operating cooling device 110.

Controller 102 determines whether the predicted temperature information indicates that set of LEDs 106 operates at an unsafe temperature when operating at the set of requested light patterns (808). In response to determining that the predicted temperature information indicates that set of LEDs 106 does not operate at the unsafe temperature ("SAFE" of 808), controller 102 operates at the set of requested light patterns (810). For example, in response to determining that T(t+1) or T(t+2) . . . and T(t+n) is safe, controller 102 applies P(t), P(t+1), P(t+2), . . . , P(t+n) on set of LEDs 106. In response, however, to determining that the predicted temperature information indicates that set of LEDs 106 operates at an unsafe temperature when operating at the requested light pattern ("UNSAFE" of 808), controller 102 determines a modified light pattern (820) and operates at the modified light pattern (822). For example, in response to determining that any one of T(t+1) or T(t+2) . . . and T(t+n) is not safe, controller 102 finds a modification P(t) to $P_{mod}(t)$, P(t+1) to $P_{mod}(t+1)$, . . . , P(t+n) to $P_{mod}(t+n)$. In some examples, in response to determining that any one of T(t+1) or T(t+2) . . . and T(t+n) is not safe, controller 102 finds a modification P(t) to $P_{mod}(t)$, P(t+1) to $P_{mod}(t+1)$, . . . , P(t+n) to $P_{mod}(t+n)$, which avoids over-temperature in pixels of T(t+1) or T(t+2) . . . and T(t+n). Additionally, or alternatively, in response to determining that any one of T(t+1) or T(t+2) . . . and T(t+n) is not safe, controller 102 finds a modification P(t) to $P_{mod}(t)$, P(t+1) to $P_{mod}(t+1)$, . . . , P(t+n) to $P_{mod}(t+n)$, which optimizes the change of P(t+1), P(t+2), . . . , P(t+n), e.g. with the goal of minimizing the change (e.g., in a light intensity output by set of LEDs 106). After determining the modification $P_{mod}(t)$, $P_{mod}(t+1)$, . . . , $P_{mod}(t+n)$, controller 102 applies the latest $P_{mod}(t)$, $P_{mod}(t+1)$, . . . , $P_{mod}(t+n)$ on set of LEDs 106. In any case, after controller 102 applies P(t+1), P(t+2), ..., P(t+n) or the latest $P_{mod}(t)$, $P_{mod}(t+1)$, ..., $P_{mod}(t+n)$ on set of LEDs 106, controller 102 may increment the time ("t:=t+1") and restart the process.

The following examples may illustrate one or more aspects of the disclosure.

Example 1

A device configured to: determine current temperature information for a set of light emitting diodes (LEDs); receive an indication of a requested light pattern for the set of LEDs; determine predicted temperature information for the set of LEDs based on the current temperature information and the requested light pattern; and operate the set of LEDs at a modified light pattern that is different from the requested light pattern in response to determining that the predicted temperature information indicates that the set of LEDs operates at an unsafe temperature when operating at the requested light pattern.

Example 2

The device of example 1, the device being further configured to: operate the set of LEDs at the requested light pattern in response to determining that the predicted temperature information indicates that the set of LEDs does not operate at the unsafe temperature.

Example 3

The device of examples 1-2 or a combination thereof, the device being further configured to: determine, for an LED of the set of LEDs, a modified light intensity that is less than a light intensity for the LED indicated by the requested light pattern, wherein the modified light pattern defines the modified light intensity for the LED.

Example 4

The device of examples 1-3 or a combination thereof, the device being further configured to: determine, for the LED of the set of LEDs, the modified light intensity in response to determining that the LED operates at the unsafe temperature when operating at the requested light pattern.

Example 5

The device of examples 1-4 or a combination thereof, wherein: the LED is a first LED; and the device is further configured to determine, for the first LED of the set of LEDs, the modified light intensity in response to determining that a second LED operates at the unsafe temperature and determining that the first LED is positioned at a distance from the second LED that is within a spatial threshold.

Example 6

The device of examples 1-5 or a combination thereof, wherein the requested light pattern is a first requested light pattern and wherein the predicted temperature information is first predicted temperature information, the device being further configured to: receive an indication of a second requested light pattern for the set of LEDs, the second requested light pattern being for output by the set of LEDs after the set of LEDs outputs the first requested light pattern; determine second predicted temperature information for the set of LEDs based on the first predicted temperature information and the second requested light pattern; and wherein the device is further configured to operate the set of LEDs at the modified light pattern in response to determining that the second predicted temperature information indicates that the set of LEDs operates at the unsafe temperature when operating the set of LEDs at the second requested light pattern.

Example 7

The device of examples 1-6 or a combination thereof, the device being further configured to: determine the modified light pattern for the set of LEDs such that the set of LEDs does not operate at the unsafe temperature and such that a difference in light intensity between the modified light pattern and a combination of the first requested light pattern and the second requested light pattern is minimized.

Example 8

The device of examples 1-7 or a combination thereof, the device being further configured to: determine the modified light pattern for the set of LEDs such that the set of LEDs does not operate at the unsafe temperature and such that a maximum temperature for the set of LEDs is minimized.

Example 9

The device of examples 1-8 or a combination thereof, the device is further configured to: receive an indication of an ambient temperature at the set of LEDs from a sensor arranged in a same chip die as the set of LEDs, wherein to determine the current temperature information for the set of LEDs, the device is configured to determine the current temperature information for the set of LEDs based on the indication of the ambient temperature at the set of LEDs from the sensor arranged in the same chip die as the set of LEDs.

Example 10

The device of examples 1-9 or a combination thereof, the device is further configured to: receive an indication of an ambient temperature at the set of LEDs from a sensor external to the set of LEDs, wherein to determine the current temperature information for the set of LEDs, the device is configured to determine the current temperature information for the set of LEDs based on the indication of the ambient temperature at the set of LEDs from the sensor external to the set of LEDs.

Example 11

The device of examples 1-10 or a combination thereof, the device being further configured to: determine the current temperature information for the set of LEDs based on previous temperature information and a previously requested light pattern.

Example 12

The device of examples 1-11 or a combination thereof, the device being further configured to: receive a temperature measurement indicating a detected temperature at the set of LEDs; and modify the predicted temperature information for the set of LEDs based on the temperature measurement.

Example 13

The device of examples 1-12 or a combination thereof, the device being further configured to: determine initial predicted temperature information based on operating a cooling device at an initial cooling performance, the current temperature information, and the requested light pattern; and operate the cooling device at a modified cooling performance that is higher than the initial cooling performance in response to determining that the initial predicted temperature information indicates that the set of LEDs operates at the unsafe temperature when operating at the requested light pattern, wherein the device is configured to determine the predicted temperature information for the set of LEDs further based on the modified cooling performance.

Example 14

The device of examples 1-13 or a combination thereof, wherein to determine the predicted temperature information for the set of LEDs further based on the modified cooling performance, the device is configured to: increase predicted temperatures at the set of LEDs from the current temperature to account for heating caused by operating the set of LEDs at the requested light pattern; and reduce the predicted temperatures at the set of LEDs to account for operating the cooling device at the modified cooling performance.

Example 15

The device of examples 1-14 or a combination thereof, wherein the device is a matrix LED device and wherein the set of LEDs is an integrated LED matrix module of the matrix LED device.

Example 16

A method comprising: determining, by a processor, current temperature information for a set of light emitting diodes (LEDs); receiving, by the processor, an indication of a requested light pattern for the set of LEDs; determining, by the processor, predicted temperature information for the set of LEDs based on the current temperature information and the requested light pattern; and operating, by the processor, the set of LEDs at a modified light pattern that is different from the requested light pattern in response to determining that the predicted temperature information indicates that the set of LEDs operates at an unsafe temperature when operating at the requested light pattern.

Example 17

The method of example 16, further comprising: operating, by the processor, the set of LEDs at the requested light pattern in response to determining that the predicted temperature information indicates that the set of LEDs does not operate at the unsafe temperature.

Example 18

The method of examples 16-17 or a combination thereof, further comprising: determining, by the processor, for an LED of the set of LEDs, a modified light intensity that is less than a light intensity for the LED indicated by the requested light pattern, wherein the modified light pattern defines the modified light intensity for the LED.

Example 19

The method of examples 16-18 or a combination thereof, wherein determining, for the LED of the set of LEDs, the modified light intensity is in response to determining that the LED operates at the unsafe temperature when operating at the requested light pattern.

Example 20

The method of examples 16-19 or a combination thereof, wherein: the LED is a first LED; and determining, for the first LED of the set of LEDs, the modified light intensity is in response to determining that a second LED operates at the unsafe temperature and determining that the first LED is positioned at a distance from the second LED that is within a spatial threshold.

Example 21

The method of examples 16-20 or a combination thereof, wherein the requested light pattern is a first requested light pattern and wherein the predicted temperature information is first predicted temperature information, the method further comprising: receiving an indication of a second requested light pattern for the set of LEDs, the second requested light pattern being for output by the set of LEDs after the set of LEDs outputs the first requested light pattern; and determining second predicted temperature information for the set of LEDs based on the first predicted temperature information and the second requested light pattern, wherein operating the set of LEDs at the modified light pattern is further in response to determining that the second predicted temperature information indicates that the set of LEDs operates at the unsafe temperature when operating the set of LEDs at the second requested light pattern.

Example 22

The method of examples 16-21 or a combination thereof, further comprising: determining the modified light pattern for the set of LEDs such that the set of LEDs does not operate at the unsafe temperature and such that a difference in light intensity between the modified light pattern and a combination of the first requested light pattern and the second requested light pattern is minimized.

Example 23

The method of examples 16-22 or a combination thereof, further comprising: determining the modified light pattern for the set of LEDs such that the set of LEDs does not operate at the unsafe temperature and such that a maximum temperature for the set of LEDs is minimized.

Example 24

The method of examples 16-23 or a combination thereof, further comprising: receiving an indication of an ambient temperature at the set of LEDs, wherein determining the current temperature information for the set of LEDs is according to the ambient temperature at the set of LEDs.

Example 25

The method of examples 16-24 or a combination thereof, further comprising: determining the current temperature information for the set of LEDs based on previous temperature information and a previously requested light pattern.

Example 26

The method of examples 16-25 or a combination thereof, further comprising: receiving a temperature measurement indicating a detected temperature at the set of LEDs; and modifying the predicted temperature information for the set of LEDs based on the temperature measurement.

Example 27

The method of examples 16-26 or a combination thereof, wherein the set of LEDs is an integrated LED matrix module of a matrix LED device.

Example 28

A system comprising: a light emitting diode (LED) matrix device comprising: an integrated LED matrix module comprising a plurality of LEDs; an integrated driver module configured to activate one or more LEDs of the integrated LED matrix module; an integrated thermal sensor configured to detect an ambient temperature at the integrated LED matrix module and to output an indication of the detected ambient temperature at the integrated LED matrix module; and a controller configured to: determine current temperature information for the LED matrix device; receive an indication of a requested light pattern for the integrated LED matrix; determine predicted temperature information for the integrated LED matrix based on the current temperature information, the requested light pattern, and the detected ambient temperature at the integrated LED matrix module; output, to the integrated driver module, an indication to operate the integrated LED matrix module at the requested light pattern when the predicted temperature information satisfies a temperature threshold; and output, to the integrated driver module, an indication to operate the integrated LED matrix module at a modified light pattern that is different than the requested light pattern when the predicted temperature information does not satisfy the temperature threshold.

Example 29

The system of example 28, wherein the integrated LED matrix module is a headlamp of an automobile and wherein the requested light pattern for the integrated LED matrix corresponds to operating the integrated LED matrix module to provide an anti-glaring operation for the automobile.

Example 30

The system of examples 28-29 or a combination thereof, wherein the controller is an electronic control unit (ECU) for controlling electronic components of the automobile.

Example 31

The system of examples 28-30 or a combination thereof, the controller being further configured to: determine initial predicted temperature information based on operating a cooling device at an initial cooling performance, the current temperature information, and the requested light pattern; and operate the cooling device at a modified cooling performance that is higher than the initial cooling performance in response to determining that the initial predicted temperature information indicates that the set of LEDs operates at an unsafe temperature when operating at the requested light pattern, wherein the device is configured to determine the predicted temperature information for the set of LEDs further based on the modified cooling performance.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:
1. A device for operating a set of light emitting diodes (LEDs), the device comprising:
   processing circuitry configured to:
      determine current temperature information for the set of LEDs;
      receive an indication of a requested light pattern for the set of LEDs;
      determine predicted temperature information for the set of LEDs based on the current temperature information and the requested light pattern;
      determine, for a first LED of the set of LEDs, a modified light intensity that is less than a light intensity for the first LED indicated by the requested light pattern in response to determining that the predicted temperature information indicates that a second LED of the set of LEDs operates at an unsafe temperature when operating at the requested light pattern and determining that the first LED is positioned at a distance from the second LED that is within a spatial threshold; and
      operate the set of LEDs at a modified light pattern that is different from the requested light pattern in response to determining that the predicted temperature information indicates that the set of LEDs operates at the unsafe temperature when operating at the requested light pattern, wherein the modified light pattern defines the modified light intensity for the first LED.

2. The device of claim 1, the processing circuitry being further configured to:
operate the set of LEDs at the requested light pattern in response to determining that the predicted temperature information indicates that the set of LEDs does not operate at the unsafe temperature.

3. The device of claim 1, the processing circuitry being further configured to:
determine, for the second LED of the set of LEDs, a modified light intensity that is less than a light intensity for the second LED indicated by the requested light pattern,
wherein the modified light pattern defines the modified light intensity for the second LED.

4. The device of claim 3, the processing circuitry being further configured to:
determine, for the second LED of the set of LEDs, the modified light intensity for the second LED in response to determining that the second LED operates at the unsafe temperature when operating at the requested light pattern.

5. The device of claim 1, wherein the requested light pattern is a first requested light pattern and wherein the predicted temperature information is first predicted temperature information, the processing circuitry being further configured to:
receive an indication of a second requested light pattern for the set of LEDs, the second requested light pattern being for output by the set of LEDs after the set of LEDs outputs the first requested light pattern;
determine second predicted temperature information for the set of LEDs based on the first predicted temperature information and the second requested light pattern; and
wherein the processing circuitry is further configured to operate the set of LEDs at the modified light pattern in response to determining that the second predicted temperature information indicates that the set of LEDs operates at the unsafe temperature when operating the set of LEDs at the second requested light pattern.

6. The device of claim 5, the processing circuitry being further configured to:
determine the modified light pattern for the set of LEDs such that the set of LEDs does not operate at the unsafe temperature and such that a difference in light intensity between the modified light pattern and a combination of the first requested light pattern and the second requested light pattern is minimized.

7. The device of claim 5, the processing circuitry being further configured to:
determine the modified light pattern for the set of LEDs such that the set of LEDs does not operate at the unsafe temperature and such that a maximum temperature for the set of LEDs is minimized.

8. The device of claim 1, the processing circuitry being further configured to:
receive an indication of an ambient temperature at the set of LEDs from a sensor arranged in a same chip die as the set of LEDs,
wherein to determine the current temperature information for the set of LEDs, the processing circuitry is configured to determine the current temperature information for the set of LEDs based on the indication of the ambient temperature at the set of LEDs from the sensor arranged in the same chip die as the set of LEDs.

9. The device of claim 1, the processing circuitry being further configured to:
receive an indication of an ambient temperature at the set of LEDs from a sensor external to the set of LEDs,
wherein to determine the current temperature information for the set of LEDs, the processing circuitry is configured to determine the current temperature information for the set of LEDs based on the indication of the ambient temperature at the set of LEDs from the sensor external to the set of LEDs.

10. The device of claim 1, the processing circuitry being further configured to:
determine the current temperature information for the set of LEDs based on previous temperature information and a previously requested light pattern.

11. The device of claim 1, the processing circuitry being further configured to:
receive a temperature measurement indicating a detected temperature at the set of LEDs; and
modify the predicted temperature information for the set of LEDs based on the temperature measurement.

12. The device of claim 1, the processing circuitry being further configured to:
determine initial predicted temperature information based on operating a cooling device at an initial cooling performance, the current temperature information, and the requested light pattern; and
operate the cooling device at a modified cooling performance that is higher than the initial cooling performance in response to determining that the initial predicted temperature information indicates that the set of LEDs operates at the unsafe temperature when operating at the requested light pattern,
wherein the processing circuitry is configured to determine the predicted temperature information for the set of LEDs further based on the modified cooling performance.

13. The device of claim 12, wherein to determine the predicted temperature information for the set of LEDs further based on the modified cooling performance, the processing circuitry is configured to:
increase predicted temperatures at the set of LEDs from the current temperature to account for heating caused by operating the set of LEDs at the requested light pattern; and
reduce the predicted temperatures at the set of LEDs to account for operating the cooling device at the modified cooling performance.

14. The device of claim 1, wherein the device is a matrix LED device and wherein the set of LEDs is an integrated LED matrix module of the matrix LED device.

15. A method for operating a set of light emitting diodes (LEDs), the method comprising:
determining, by a processor, current temperature information for the set of LEDs;
receiving, by the processor, an indication of a requested light pattern for the set of LEDs;
determining, by the processor, predicted temperature information for the set of LEDs based on the current temperature information and the requested light pattern;
determining, by the processor, for a first LED of the set of LEDs, a modified light intensity that is less than a light intensity for the first LED indicated by the requested light pattern in response to determining that the predicted temperature information indicates that a second LED of the set of LEDs operates at an unsafe temperature when operating at the requested light pattern and determining that the first LED is positioned at a distance from the second LED that is within a spatial threshold; and operating, by the processor, the set of LEDs at a modified light pattern that is different from the requested light pattern in response to determining that the predicted temperature information indicates that the set of LEDs operates at the unsafe temperature when operating at the requested light pattern, wherein the modified light pattern defines the modified light intensity for the first LED.

16. The method of claim 15, further comprising:
operating, by the processor, the set of LEDs at the requested light pattern in response to determining that the predicted temperature information indicates that the set of LEDs does not operate at the unsafe temperature.

17. The method of claim 15, further comprising:
determining, by the processor, for the second LED of the set of LEDs, a modified light intensity that is less than a light intensity for the second LED indicated by the requested light pattern,
wherein the modified light pattern defines the modified light intensity for the second LED.

18. The method of claim 17, wherein determining, for the second LED of the set of LEDs, the modified light intensity for the second LED is in response to determining that the second LED operates at the unsafe temperature when operating at the requested light pattern.

19. A system comprising:
a light emitting diode (LED) matrix device comprising:
an integrated LED matrix module comprising a plurality of LEDs;
an integrated driver module configured to activate one or more LEDs of the integrated LED matrix module;
an integrated thermal sensor configured to detect an ambient temperature at the integrated LED matrix module and to output an indication of the detected ambient temperature at the integrated LED matrix module; and
a controller comprising processing circuitry, the processing circuitry being configured to:
determine current temperature information for the LED matrix device;
receive an indication of a requested light pattern for the integrated LED matrix;
determine predicted temperature information for the integrated LED matrix based on the current temperature information, the requested light pattern, and the detected ambient temperature at the integrated LED matrix module;
output, to the integrated driver module, an indication to operate the integrated LED matrix module at the requested light pattern when the predicted temperature information satisfies a temperature threshold; and
determine, for a first LED of the integrated LED matrix, a modified light intensity that is less than a light intensity for the first LED indicated by the requested light pattern when the predicted temperature information indicates that a second LED of the integrated LED matrix does not satisfy the temperature threshold and when the first LED is positioned at a distance from the second LED that is within a spatial threshold; and
output, to the integrated driver module, an indication to operate the integrated LED matrix module at a modified light pattern that is different than the requested light pattern when the predicted temperature information does not satisfy the temperature threshold, wherein the modified light pattern defines the modified light intensity for the first LED.

20. The system of claim 19, wherein the integrated LED matrix module is a headlamp of an automobile and wherein the requested light pattern for the integrated LED matrix corresponds to operating the integrated LED matrix module to provide an anti-glaring operation for the automobile.

21. The system of claim 20, wherein the controller is an electronic control unit (ECU) for controlling electronic components of the automobile.

* * * * *